(12) United States Patent
Takahashi

(10) Patent No.: US 6,332,305 B1
(45) Date of Patent: Dec. 25, 2001

(54) HEAT SEAL DEVICE OF FILLING AND PACKAGING MACHINE

(75) Inventor: Yoshimori Takahashi, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/462,817

(22) PCT Filed: May 20, 1999

(86) PCT No.: PCT/JP99/02676

§ 371 Date: Jan. 14, 2000

§ 102(e) Date: Jan. 14, 2000

(87) PCT Pub. No.: WO99/59877

PCT Pub. Date: Nov. 25, 1999

(30) Foreign Application Priority Data

May 20, 1998 (JP) .................................................. 10-138017

(51) Int. Cl.$^7$ ....................................................... B65I 9/06
(52) U.S. Cl. ............................... 53/551; 53/554; 53/555; 53/371.4; 493/271
(58) Field of Search ................................ 53/551, 554, 555, 53/550, 371.4; 493/271, 278, 280

(56) References Cited

U.S. PATENT DOCUMENTS 4,215,626 * 8/1980 Giulianotto ........................... 493/278
4,631,905 * 12/1986 Maloney ................................ 53/554
5,255,497 * 10/1993 Zoromski et al. .................... 53/551
5,460,844 * 10/1995 Gaylor ................................... 53/554

FOREIGN PATENT DOCUMENTS 6-312723  11/1994  (JP) .
6-81909   11/1994  (JP) .

* cited by examiner

Primary Examiner—Peter Vo
Assistant Examiner—Sam Tawfik
(74) Attorney, Agent, or Firm—McDermott, Will & Emery

(57) ABSTRACT

In a heat seal device of a filling and packaging machine, wherein a continuously fed film F is vertically sealed by a vertical seal mechanism 19 and the laterally sealed by lateral seal mechanisms 20, 21, contents W, W1, W2 are filled in the film formed in the bottomed cylindrical shape and, while the film F is fed, a portion of the film F which forms a bag opening part side is sealed laterally by the lateral seal mechanisms 20,21 for continuously packaging as pouches P, the vertical seal mechanism 19 comprises a pair of rotating shafts 25 incorporating heaters H and mounted rotatably and two pairs of vertical seal rolls 31, 34 which are mounted in pairs on the rotating shafts 25 with a given distance in the axial direction of the rotating shafts 25 and have seal portions 30,35 protruded in a flange shape around outer peripheral portions thereof respectively, the heaters H incorporated in the rotating shafts 25 are disposed movably along the axial direction of the rotating shafts 25 with the position of the heaters H capable of being adjusted movably relative to the position of two pairs of the vertical seal rolls 31, 34.

4 Claims, 10 Drawing Sheets

HEAT SEAL DEVICE OF FILLING AND PACKAGING MACHINE

TECHNICAL FIELD

This invention relates to a heat seal device of a filling and packaging machine which forms packaging bags from a film wound in a roll shape and fills contents made of material in a liquid form, a powdery form or a paste form in the packaging bags.

BACKGROUND OF THE INVENTION

As a filling and packaging machine for filling and packaging contents made of material in a liquid form, a powdery form or a paste form, as disclosed in Japanese Laid-open Patent publication HEI 1-153410, Japanese Laid-open Patent publication HEI 2-4626 or Japanese Laid-open Patent publication HEI 2-32929, a machine which folds back a continuously fed film, overlaps both folded back end peripheries of the film and vertically seals such end peripheries by means of a vertical seal mechanism, fills a content in the inside of the vertically sealed film, laterally seals this film by means of lateral seal mechanisms so as to form pouches and cuts the central portions of the laterally sealed portions by means of a cutter mechanism to separate these pouches as single-pack pouches and transfers them or alternatively laterally seals the film by means of lateral seal mechanisms to form pouches and transfers pouches which are connected in a continuous form, and packages these pouches in an accommodating box, is known. One example of such a machine is explained in conjunction with FIG. 5.

In the drawing, numeral 1 indicates a machine base and holder frames 2 are disposed at the side portion of the machine base 1. Film rolls R which is made of films F wound in a roll form are replaceably mounted on the holder frames 2. A film guide portion 3 and a film folding back portion 4 are disposed at the upper portion of the machine base 1. To the front surface portion of the machine base 1, a vertical seal mechanism 5, a first and second lateral seal mechanisms 6, 7, and a cutter mechanism 8 are provided in the order from above. The film F is pulled out from one film roll R in a roll form and the film F is lead out to the film folding back portion 4 by way of the film guide portion 3. The film F is folded back in a double folded manner along a longitudinal direction by the film folding back portion 4. The folded back end peripheral portions of the film F are subjected to a heat seal by means of a pair of vertical seal rolls 9 of the vertical seal mechanism 5 which face each other in an opposed manner and then are fed out. The film F is formed in a cylindrical shape by means of this vertical seal portion FH. The film F is heat sealed in a lateral direction by means of a pair of lateral seal rolls 10 of the first lateral seal mechanism 6 which face each other in an opposed manner so as to form bottoms of packing bags by means of these lateral seal portions FS. In the inside of the film F formed in a cylindrical shape having the bottom, a content W made of a liquid such as sauce is filled. The film F is further advanced and the bag opening side of the film F is again laterally sealed by means of a pair of lateral seal rolls 10 of the first lateral seal mechanism 6 to hermetically fill the content W and this lateral sealed portion FS is again hermetically sealed so as to seal three sides of the film F thus forming pouches P by means of a pair of lateral seal rolls 10A provided to the second lateral seal mechanism 7. Subsequently, the intermediate portions of the lateral sealed portions FS which are provided for forming the pouches P are cut by the cutter mechanism 8 so as to form pouches P in a single-pack form and the pouches are transferred. Alternatively, after forming pouches P by laterally sealing the film F by means of the lateral seal mechanisms 6, 7, the operation of the cutter mechanism 8 is stopped and the pouches P in a continuous-pack form which are made of continuously connected pouches P are transferred.

Furthermore, the above-mentioned pouches P which are formed such that three sides thereof are sealed may be formed as shown in FIG. 6, wherein the pouch P which is filled with the content W is formed by a vertical sealed portion FH which is formed by heat sealing both folded back end portions of the film F by means of the vertical seal rolls 9 and the lateral seal portions FS which are heat sealed by means of the lateral seal rolls 10, 10A in a direction perpendicular to the longitudinal direction of the film F.

Furthermore, as shown in FIG. 7, the pouches P may be formed such that four sides of the film F are sealed by vertical seal portions FH1, FH2 which are formed by respectively heat sealing the folded back end portions and the back-like peripheral portion of the film F by means of two vertical seal rolls not shown in drawings and lateral seal portions FS which are formed by heat sealing the film F by means of lateral seal rolls not shown in drawings in a direction perpendicular to the longitudinal direction of the film F.

Furthermore, as shown in FIG. 8, the pouches P may be formed such that two sheets of films F1, F2 are overlapped and pulled out while being guided, both side peripheral portions of these films F1, F2 are respectively heat sealed by two vertical seal rolls not shown in drawings to form a bag in a cylindrical form with vertical sealed portions FH1, FH2 at both sides of the films F1, F2 and subsequently, lateral sealed portions FS are formed by heat sealing the bag by means of lateral seal rolls not shown in the drawing in a direction perpendicular to the longitudinal direction of the film F so as to form pouches P which have four sides thereof heat sealed.

Furthermore, a filling and packaging machine shown in FIG. 9 or the like is also proposed. In the drawing, a sheet of film F is pulled out while being guided in a half folded condition, the folded back end portions which are half folded back and the central portion of the folded back film F are respectively heat sealed by two vertical seal rolls not shown in the drawing such that cylindrical bags in two rows are formed by the heat sealed vertical seal portions FH1, FH2, and contents W1, W2 of different kinds, sauce and mayonnaise or soy sauce and spicy oil, for example, are filled in cylindrical bags of respective rows, and subsequently, the film F is heat sealed in a direction perpendicular to the longitudinal direction of the film F by means of lateral seal rolls not shown in the drawing, whereby pouches P are packaged and sealed in two rows by these heat sealed lateral sealed portions FS and the above-mentioned vertical sealed portions FH1, FH2.

By the way, at the time of forming the packaging pouches P as shown in the above-mentioned FIG. 7–FIG. 9, in case the width or the vertical seal position of the pouch P to be packaged is different, in general, as shown in FIG. 10, at least one vertical seal roll 9A out of vertical seal rolls 9, 9A which are fixedly mounted on the rotating shaft 5A of the vertical seal mechanism 5 is movably adjusted relative to the rotating shaft 5A corresponding to the width and the vertical seal position of the film F and hence, the vertical sealed position FH2 is set corresponding to the width of the pouch P.

In this case, the rotating shaft 5A is inserted in the vertical seal roll 9A such that the vertical seal roll 9A is disposed around the outer peripheral portion of the rotating shaft 5A. This vertical seal roll 9A is mounted on and fixedly secured to the rotating shaft 5A at a given position by fastening with bolts or the like.

Here, a heater not shown in the drawing is incorporated in the rotary shaft 5A and the heat of this heater is transmitted to the vertical seal rolls 9, 9A by way of the rotating shaft 5A and hence, the vertical seal rolls 9, 9A are heated. The conventional heater, however, is fixedly secured to the rotating shaft 5A and hence, a given temperature distribution is present corresponding to the mounting position of the heater relative to the rotating shaft 5A. In general, in a longitudinal direction of the heater, the temperature takes the highest value around the central portion of the heater and is lowered gradually in a direction from the central portion to the end portions of the heater. In this case, to compare the movable vertical seal roll 9A with the fixed vertical seal roll 9, the distances between the respective vertical seal rolls 9, 9A and the heater are different so that the surface temperatures of the seal portions of the vertical seal rolls 9, 9A become different and hence, the vertical sealed portion FH1 and the vertical sealed portion FH2 differ in the sealed condition.

Accordingly, although the heater can cope with pouches with a narrow distance between the vertical sealed portion FH1 and the vertical sealed portion FH2, this temperature difference becomes remarkable with respect to pouches with a wide distance between the vertical sealed portion FH1 and the vertical sealed portion FH2. Therefore, while the proper sealing is obtained at one vertical sealed portion, the film is excessively fused at the other vertical sealed portion or, in an opposite case, the film is insufficiently fused or adhered thus resulting in the sealing failure.

Furthermore, two pairs of vertical seal rolls 9, 9A differ in their respective shapes and volumes and hence, they differ in the heat capacities, the manner of transmitting heat and also in the heat radiation condition. Although the surface temperatures of the sealed portions of two pairs of the vertical seal rolls 9, 9A may be made equal by performing a calculation in a thermal engineering manner corresponding to the volumes and the shapes and then, by differing the winding densities of the heater in a longitudinal direction of the heater, for example, there arises a problem that it pushes up the design cost and the manufacturing cost.

Accordingly, it is an object of the present invention to provide a heat seal device of a filling and packaging machine which can assure the stable sealed condition of the vertically sealed parts, wherein the surface temperatures of the sealed portions which are respectively provided to two pairs of vertical seal rolls mounted on the rotating shafts with a given distance in an axial direction of the rotating shafts are made substantially equal with a simple construction.

DISCLOSURE OF THE INVENTION

The present invention discloses a heat seal device of a filling and packaging machine, wherein a continuously fed film is vertically sealed by a vertical seal mechanism so as to form the film in a cylindrical shape and sealed laterally by lateral seal mechanisms so as to form a bottom portion which forms packaging bags, contents are filled in the film formed in the bottomed cylindrical shape and, while the film is fed, a portion of the film which forms a bag opening portion side is sealed laterally by the lateral seal mechanisms for continuously packaging as pouches, the improvement being characterized in that the vertical seal mechanism comprises a pair of rotating shafts incorporating heaters and mounted rotatably and two pairs of vertical seal rolls which are mounted in pairs on the rotating shafts with a given distance in the axial direction of the rotating shafts and have seal portions protruded in a flange shape around outer peripheral portions of said vertical seal rolls respectively, the heaters incorporated in the rotating shafts are disposed movably along the axial direction of the rotating shafts with the position of the heaters capable of being adjusted movably relative to the position of two pairs of the vertical seal rolls so that the surface temperatures of the seal portions of two pairs of the vertical seal rolls are made generally equal to each other. Due to such a constitution, the surface temperatures of the respective seal portions which are provided to two pair of the vertical seal rolls mounted on the rotating shaft with a given distance in an axial direction of the rotating shaft can be substantially made equal readily and the sealed condition of the vertical sealed portions can be made stable.

Furthermore, according to the above-mentioned heat seal device of the filling and packaging machine, the rotating shaft is made of a hollow shaft, the heater is inserted into the inside of the hollow shaft, and the heater is movably disposed in the inside of the hollow shaft. Due to such a constitution, the rotating shafts made of the hollow shafts are heated by the heater and then two pairs of the vertical seal rolls which are mounted on the outer peripheral portions of the rotating shaft are heated by way of the rotating shafts. Here, the heaters incorporated in the rotating shafts are movably disposed along the axial direction of the rotating shaft and the position of the heater can be moved and adjusted in the inside of the hollow shaft relative to the positions of two pairs of the vertical seal rolls such that the surface temperatures of the respective sealed portions provided to two pairs of vertical seal rolls can be substantially made equal and hence, the temperatures of the vertical seal rolls which respectively form pairs can be maintained at a substantially constant value.

Furthermore, according to the above-mentioned heat seal device of the filling and packaging machine, spacers are provided to end portions of the heaters and the heaters are pressed by way of the spacers for making the heaters movable. Due to such a constitution, at the time of moving and adjusting the position of the heaters relative to the position of two pairs of the vertical seal rolls in the inside of rotating shafts made of the hollow shafts by way of the spacers, the heaters can be protected by the spacers and hence, the heaters are prevented from the rupture thereof.

Furthermore, according to the above-mentioned heat seal device of the filling and packaging machine, at least one pair of the vertical seal rolls are mounted such that the vertical seal rolls can be moved relative to the rotating shaft in an axial direction of the rotating shaft. Due to such a constitution, the vertical seal roll mounting position can be readily moved and adjusted along the axial direction of the rotating shaft corresponding to the width of the pouches or the vertical sealed positions. Furthermore, the heater can be moved and adjusted corresponding to the position of the vertical seal rolls which are moved and adjusted in the above mentioned manner. Accordingly, the surface temperatures of the vertical seal rolls which respectively form pairs can be set to substantially equal value and hence, the stable sealed condition can be obtained.

Furthermore, according to the above-mentioned heat seal device of the filling and packaging machine, the vertical seal rolls are provided with temperature detection means. Due to such a constitution, the temperature of the vertical seal rolls can be measured by the temperature detection means and hence, the surface temperatures of the vertical seal roll portions can be substantially made equal and the degree of sealing at the sealed portions formed by respective pairs of the vertical seal rollers can be made equal thus stabilizing the sealed condition of the vertical sealed portions.

BEST MODE FOR CARRYING OUT THE INVENTION

Figure 1:
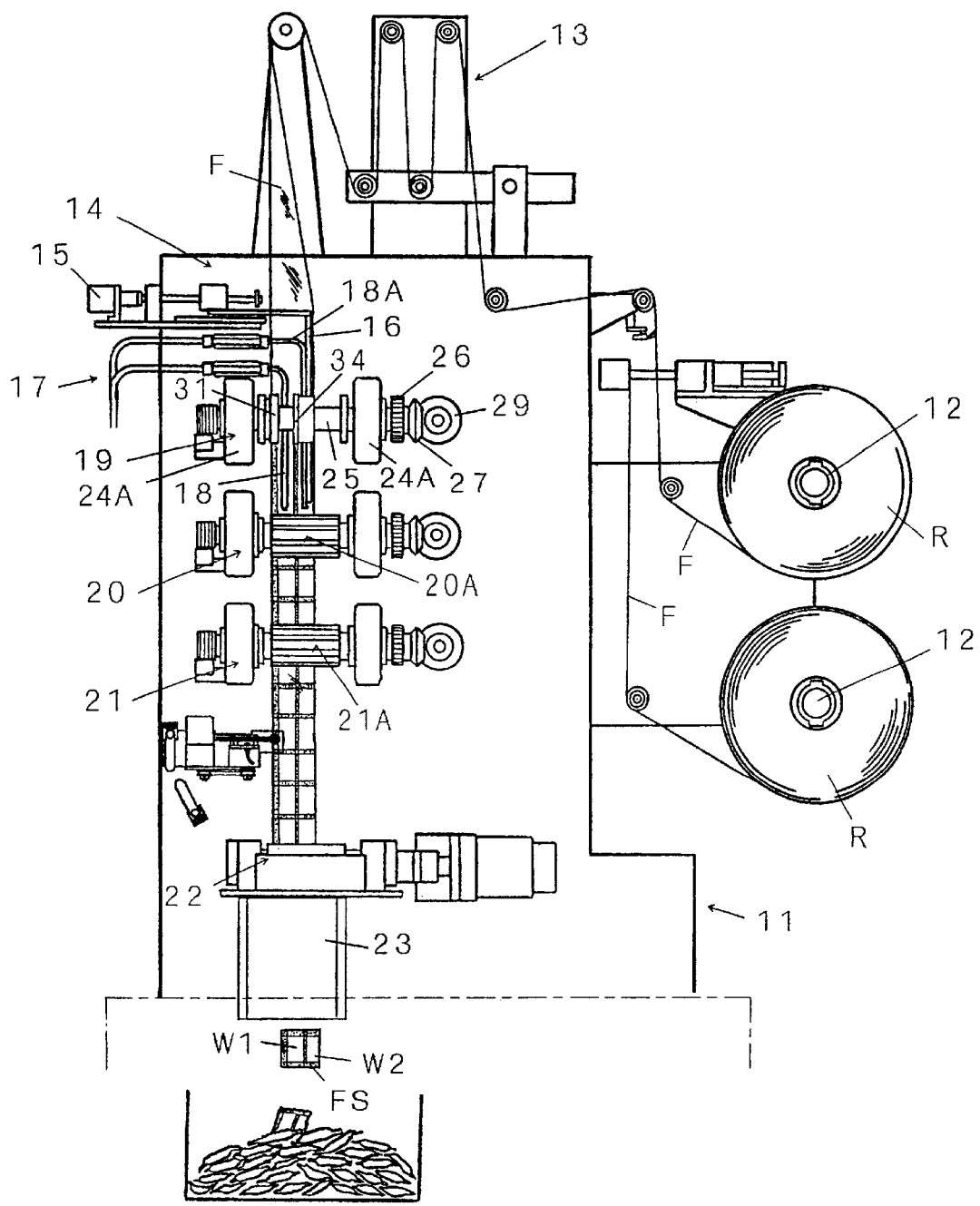
FIG. 1 is a front view of a filling and packaging machine showing one embodiment of the present invention.
Figure 2:
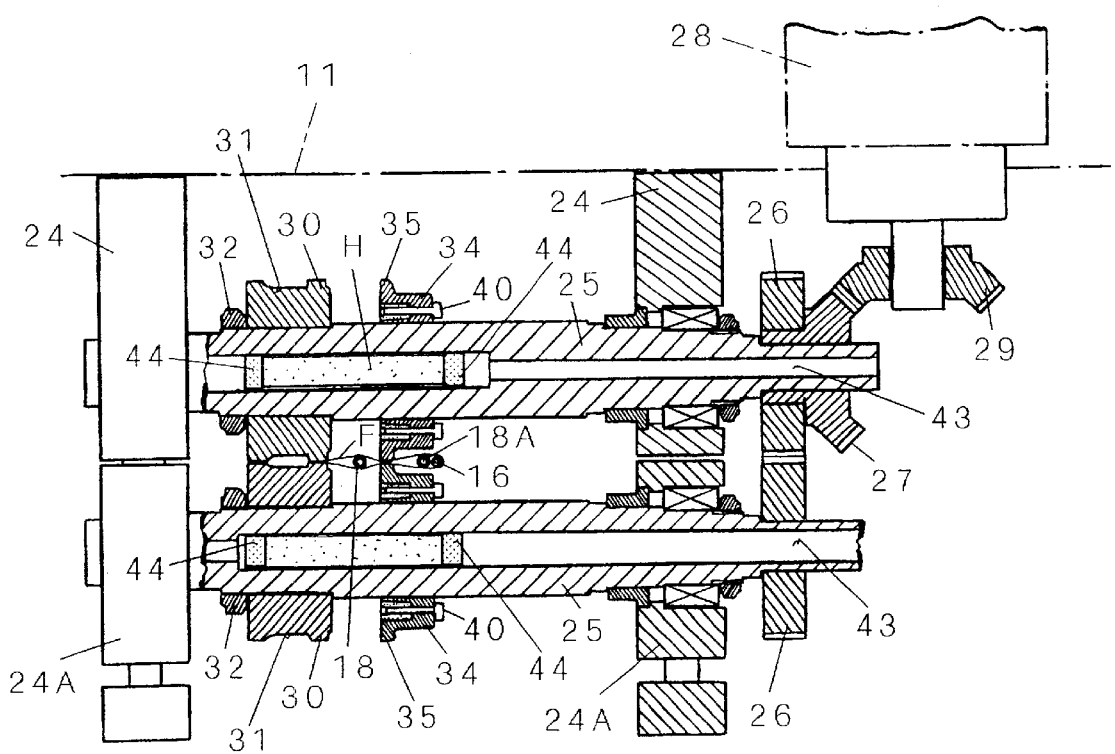
FIG. 2 is a plan view showing a vertical seal mechanism with a part in section of one embodiment of the present invention.
Figure 3:
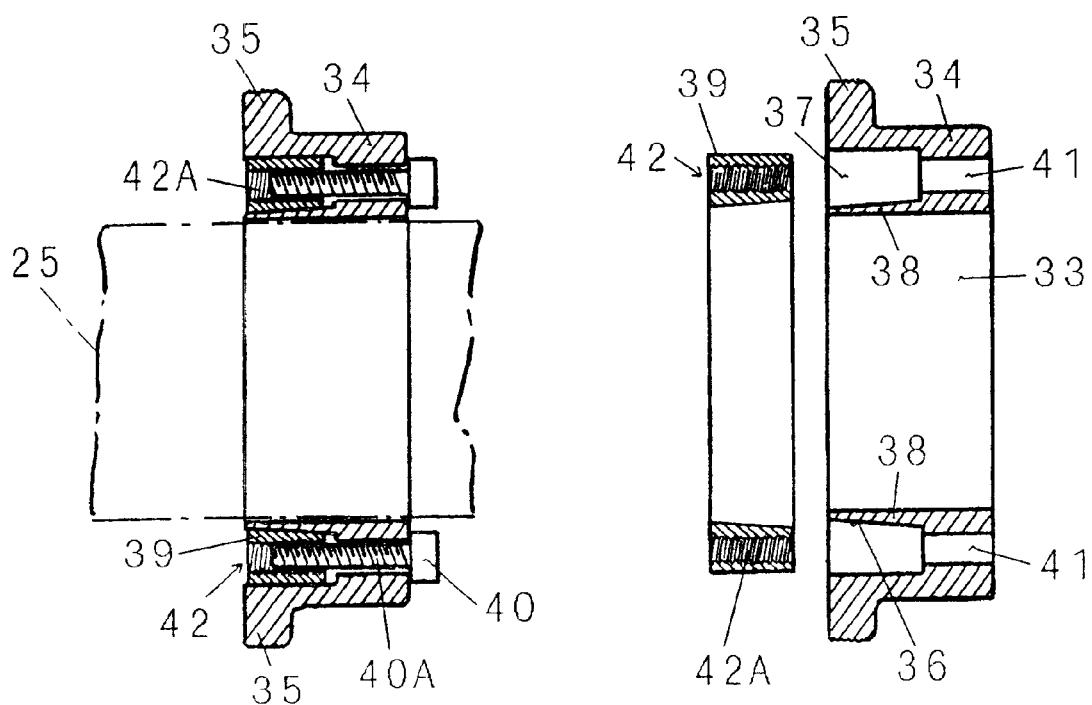
FIG. 3 is a cross sectional view of an essential part of the vertical seal mechanism of one embodiment of the present invention.
Figure 4:
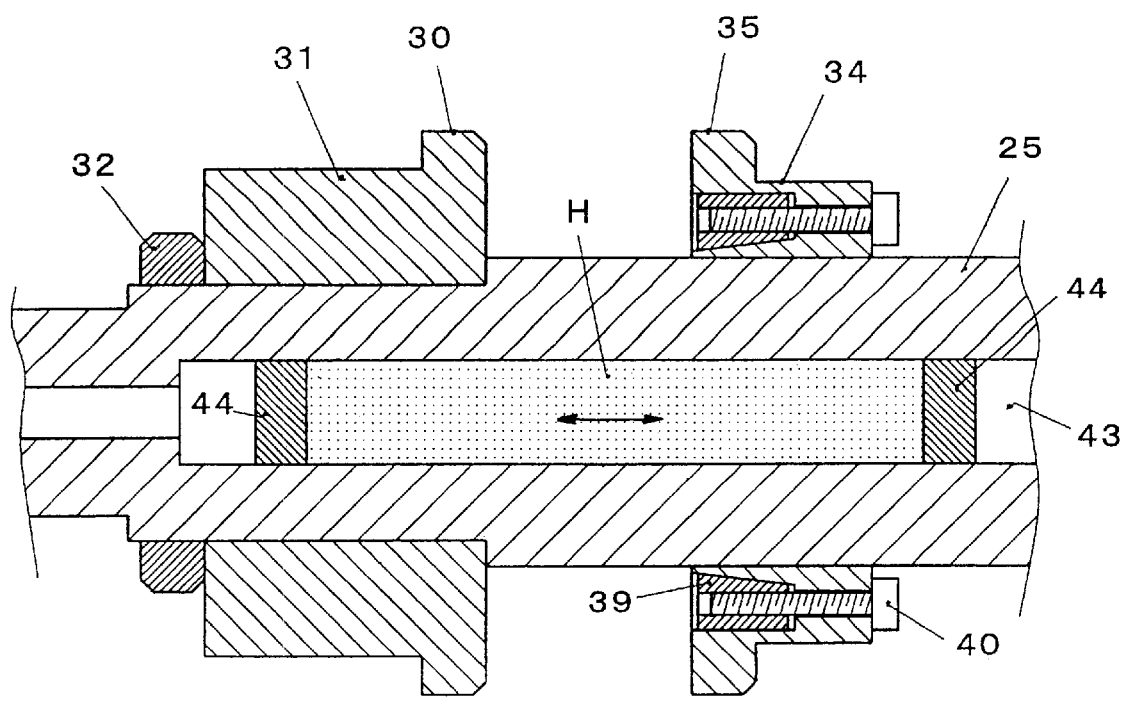
FIG. 4 is a cross sectional view of an essential part of the vertical seal mechanism of one embodiment of the present invention.
Figure 5:
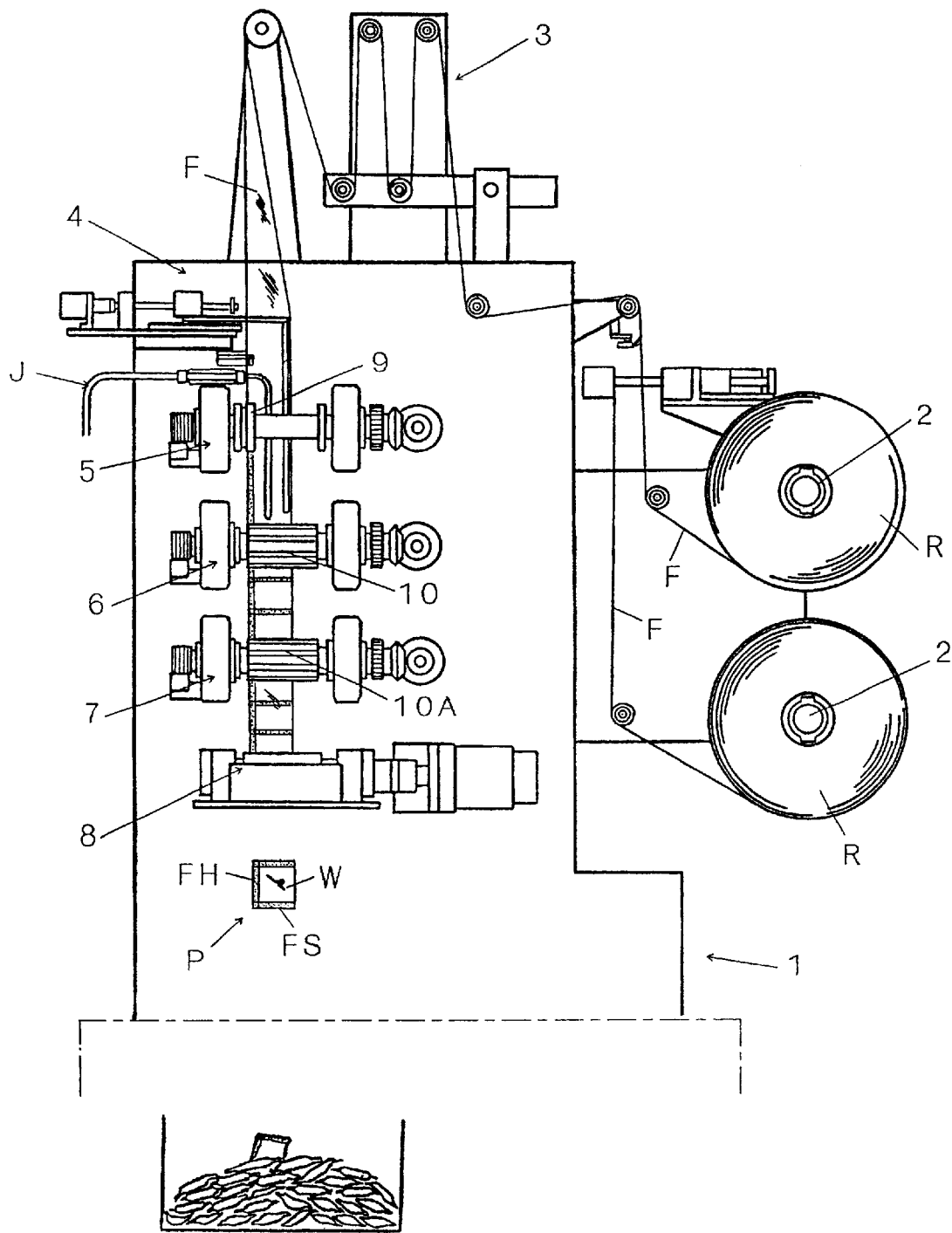
FIG. 5 is a front view of a filling and packaging machine of a conventional example.
Figure 6:
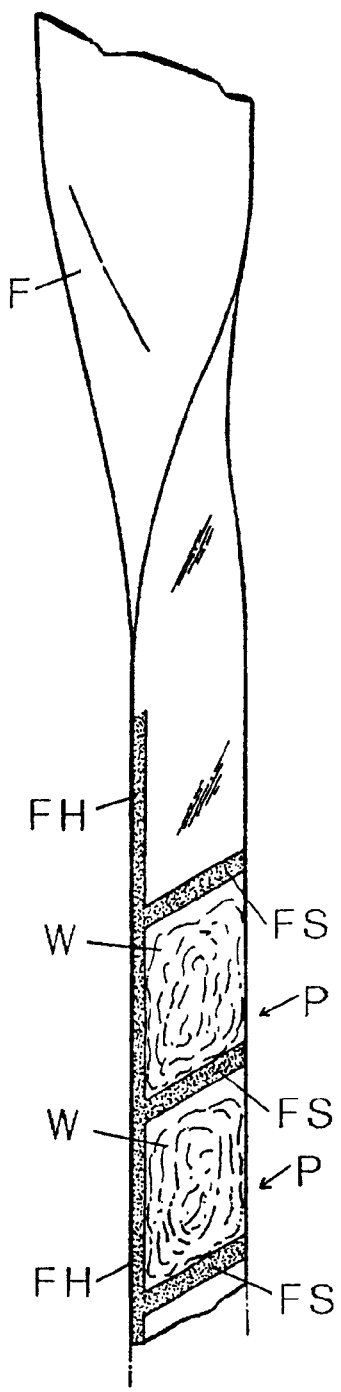
FIG. 6 is a perspective view of packaging bags of a conventional example having three sides thereof sealed.

The embodiments of the present invention are hereinafter explained in conjunction with attached drawings. FIG. 1 to FIG. 4 show one embodiment of the present invention, wherein at a side of a machine base 11 of a filling and packaging machine, holder frames 12 which replaceably hold film rolls R wound in a roll shape are disposed and the films F are pulled out from the film rolls R supported by the holder frames 12 while being guided by the holder frames 12.

On the upper portion of the machine base 11, a film guide portion 13 made of a film slackening prevention mechanism is mounted such that the film F which passes through this film guide portion 13 is led to a film folding back portion 14. An adjusting mechanism 15 which is capable of adjusting the movement of the film F corresponding to the width of the film F is provided to the film folding back portion 14. A bar-like guide rod 16 which supports and guides the folded back portion of the film F is also provided to the film folding back portion 14 in a vertically downwardly extending manner.

A pair of nozzles 18, 18A which are provided to a filling mechanism 17 and vertically downwardly extend are arranged in parallel with this guide rod 16. Through these respective nozzles 18, 18A, contents W1, W2 such as sauce, mayonnaise, soy sauce or the like can be filled.

Below the film folding back portion 14, on the front surface of the machine base 1, a vertical seal mechanism 19, first and second lateral seal mechanisms 20, 21 and a cutter mechanism 22 are disposed in the order from the above. Upon actuation of the cutter mechanism 22, pouches p are cut out as packaged single-pack pouches and these pouches P are transferred by way of a discharge mechanism 23. Alternatively, the operation of the cutter mechanism 22 is stopped and pouches P are formed by laterally sealing the film by means of the lateral seal mechanisms 20, 21 and pouches P which are connected in a continuous manner are discharged through the discharge mechanism 23.

By the way, in the vertical seal mechanism 19 of the present invention, bearing bases 24, 24A are mounted on the front surface of the machine base 11 and a pair of rotating shafts 25 which are provided to the vertical seal mechanism 19 are rotatably supported between and by the bearing bases 24, 24A. A pair of the rotating shafts 25 are disposed in parallel to each other such that they sandwich the above-mentioned guide rod 16 and respective nozzles 18, 18A. One rotating shaft 25 and the other rotating shaft 25 are respectively provided with helical gears 26 which are meshed with each other. A driven bevel gear 27 is integrally mounted on one helical gear 26 and the driven bevel gear 27 is meshed with a driving bevel gear 29 which is driven by a drive device 28 installed in the inside of the machine base 11.

Furthermore, a pair of first vertical seal rolls 31 are mounted on a pair of rotating shafts 25 such that the rotating shafts 25 pass through the first vertical seal rolls 31, wherein the first vertical seal rolls 31 are provided with seal portions 30 which protrude like a flange on the outer peripheral portions thereof for overlapping and heat sealing both folded back end peripheries of the folded back film F which are folded back by the film folding back portion 14. The respective vertical seal rolls 31 are fixedly mounted on the rotating shafts 25 by way of fixed nuts 32.

Figure 9:
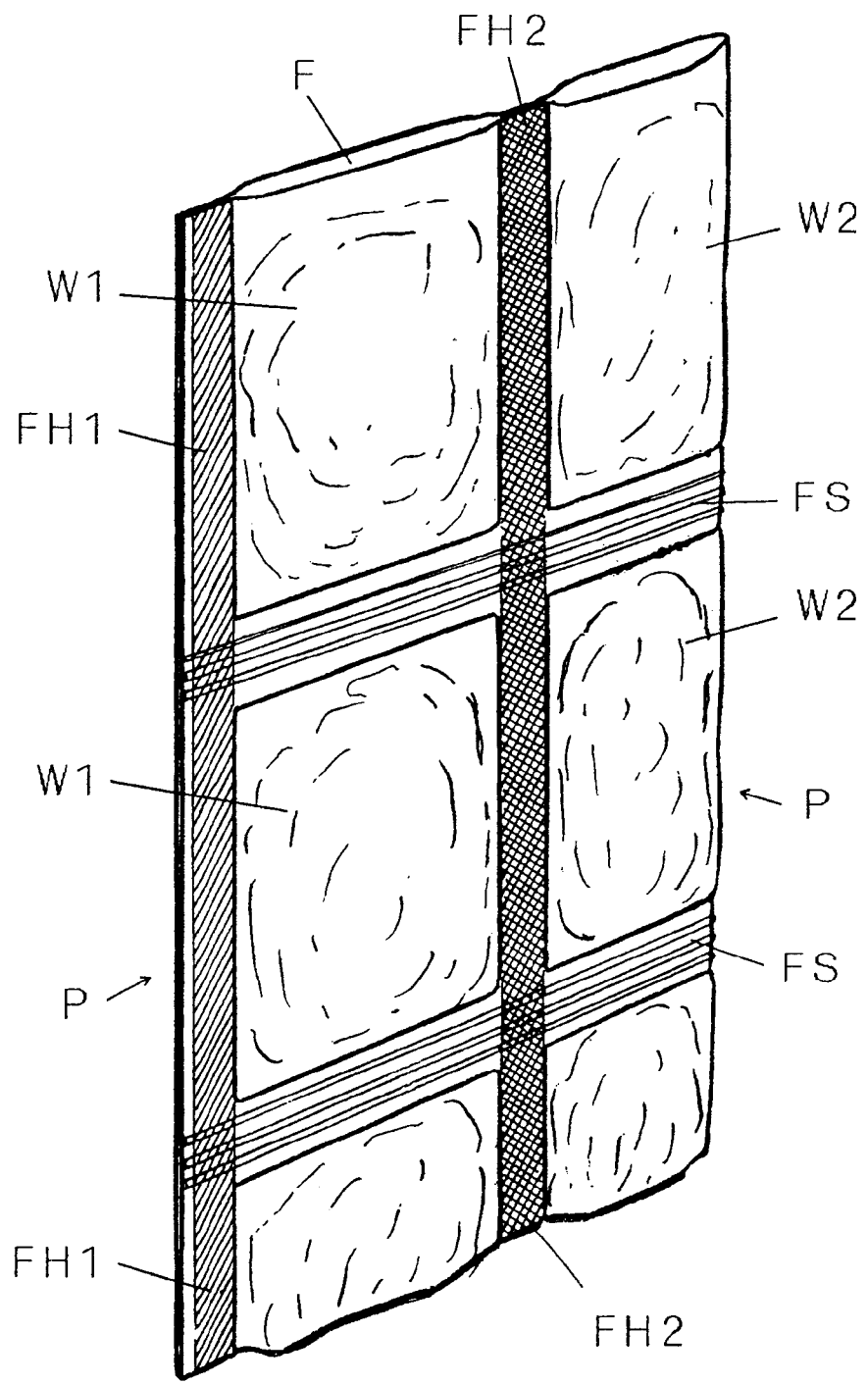
FIG. 9 is a perspective view of packaging bags which are formed in two rows to which a conventional example and the present invention are applicable.
Figure 10:
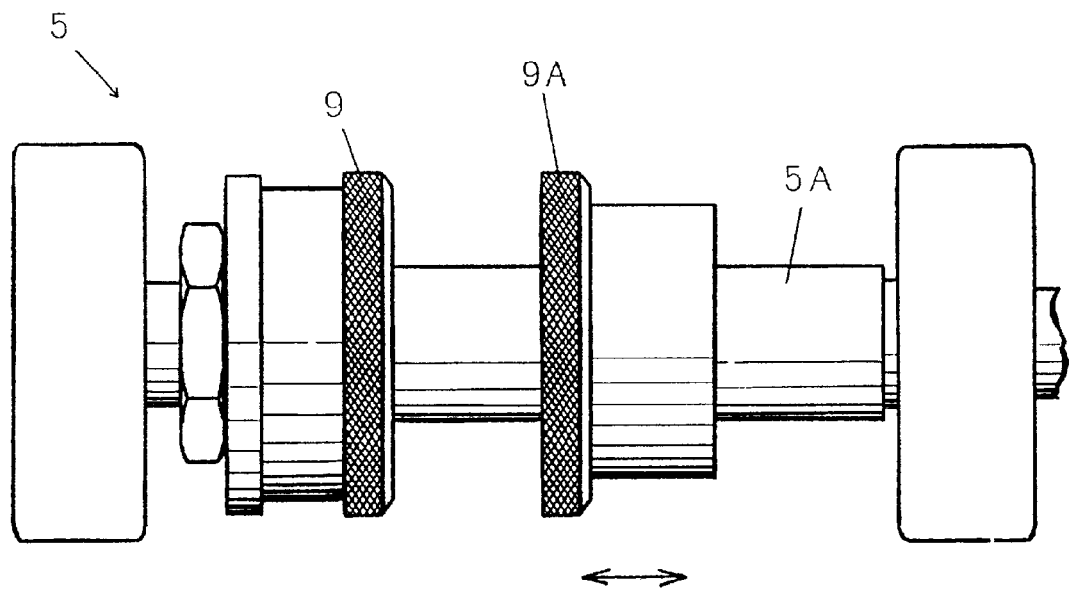
FIG. 10 is a front view of an essential part showing a vertical seal mechanism which and showing one of conventional examples.

Furthermore, in case of forming and sealing pouches P shown in FIG. 9, in addition to the first vertical seal rolls 31, a heat seal mechanism which heat seals the central portion of the folded back film F in a vertical direction is provided. In this embodiment, second vertical seal rolls 34 which are formed with mounting holes 33 allowing respective rotating shafts 25 pass therethrough and vertically seal the central portion of the folded back film F are movably mounted on with the outer peripheral portions of the rotating shafts 15 along the axial direction of the rotating shafts 25.

These second vertical seal rolls 34 are disposed in a spaced apart manner with a given distance in the axial direction of the rotating shafts 25 relative to the first vertical seal rolls 31. The second vertical seal rolls 34 are provided with seal portions 35 which protrude like a flange on the outer peripheral portions thereof. With such a provision, the central portion of the film F which is folded back and fed is pressed and heat sealed along with the rotation of a pair of the second vertical seal rolls 34.

At the sides of the second vertical seal rolls 34, annular groove portions 37 which are formed with tapered surfaces 36 in the inside thereof are provided. Due to these annular groove portions 37, annular tapered thin film portions 38 are formed at the mounting hole 33 sides. By inserting and disposing taper rings 39 which have an approximately same shape as that of the annular groove portions 37 in the annular groove portions 37, inserting and disposing the tapered rings 39 in the inside of the annular groove portions 37 of the second vertical seal rolls 34 and then inserting fastening bolts 40 into bolt inserting holes 41 formed in the second vertical seal rolls 34 and bolt mounting holes 42 formed in the tapered rings 39 and fastening these fastening bolts 40 by rotation, threaded portions 42A formed in the bolt mounting holes 42 and threaded portions 40A of the fastening bolt 40 are engaged with each other. Due to such an engagement, the tapered rings 39 are fitted into the annular groove portions 37 formed in the second vertical seal roll 34 in the depth direction thereof, that is, along the axial direction of the rotating shafts 25. Simultaneously with this operation, the tapered thin film portions 38 formed on the second vertical seal rolls 34 have the diameter thereof narrowed toward the outer peripheral surface of the rotating shafts 25 and hence, the tapered thin film portions 38 are fastened and secured to the outer peripheral surface of the rotating shafts 25. Accordingly, the second vertical seal rolls 34 are fixedly secured to the rotating shafts 25 at a given position which is a given distance spaced apart from the first vertical seal rolls 31 in the axial direction of the rotating shafts 25.

In this manner, the vertical seal mechanisms 19 are constructed such that two pairs of vertical seal rolls 31, 34 having seal portions 30, 35 which protrude like a flange on the outer peripheral portions thereof are mounted on the rotating shafts 25 while forming pairs respectively in a spaced apart manner from each other with a given distance in the axial direction of the rotating shafts 25.

A pair of the rotating shafts 25, 25 are made of hollow shafts and heaters H are respectively disposed in the insides of the hollow shafts. The rotating shafts 25 are heated by these heaters H and the first vertical seal rolls 31 and the second vertical seal rolls 34 are heated by way of these heated rotating shafts 25.

The heaters H incorporated in the rotating shafts 25 are movably disposed in the axial direction of the rotating shafts 25. The position of the heaters H relative to the position of two pairs of vertical seal rolls 31, 34 can be moved and adjusted in the insides of the hollow shafts such that the surface temperatures of the respective seal portions 30, 35 of two pairs of vertical seal rolls 31, 34 made of the first vertical seal rolls 31 and the second vertical seal rolls 34 become substantially equal.

To explain more concretely, the rotating shafts 25 are provided with hollow portions 43 which extend through from one sides to the other sides of the rotary shafts 25. Bar-like heaters H having an outer diameter slightly smaller than an inner diameter of the hollow portions 43 are inserted in the hollow portions 43 and spacers 44 are simultaneously inserted in the hollow portions 43 such that spacers 44 are provided to both end portions of the heaters H. Then, the heaters H are pressed by pusher bars not shown in the drawing by way of the spacers 44 such that the heaters H are deeply inserted into the insides of the rotating shafts 25. Simultaneously, pusher bars are inserted into the rotating shafts 25 from one-side opening portions or other-side opening portions of the rotating shafts 25 and spacers 44 are pushed by these pusher bars so as to set the heaters H at proper positions.

Due to such a positional setting, in the condition that electricity is supplied to the heaters H, the surface temperatures of the seal portions 30, 35 of the first and second vertical seal rolls 31, 34 are made substantially equal. Accordingly, the degree of sealing of the sealed portions FH1, FH2 which are formed by the first and second vertical seal rolls 31, 34 can be made equal and hence, the sealed condition of the vertical sealed portions FH1, FH2 can be stabilized.

That is, by merely balancing the temperatures of the seal portions 30, 35 of the first and second vertical seal rolls 31, 34, a proper seal can be obtained by setting the temperature of the heaters H and hence, the sealed condition can be made stable.

Furthermore, with the provision of the spacers 44, at the time of pressing the heaters H by pushing the heaters H with the push bars, the heaters H are not directly pushed by the push bars but are pushed by way of the spacers 44 and hence, an effect that the rupture of the heaters H can be prevented is obtained.

As has been described above, in the filling and packaging machine of the embodiment, the film F is pulled out from the film roll R wound like a roll while being guided, this continuously transferred film F is fed to the film folding back portion 14 by way of the film guide portion 13, the film F is fed to the vertical heat seal mechanism 19 in the condition that the film F is folded back in a double fold along the guide rod 16 provided to the film folding back portion 14, the film F is vertically sealed in the vertical direction by means of the first vertical seal rolls 31 while overlapping the both folded back end peripheries of the folded back film F, the central portion of the folded back film F is vertically sealed in the vertical direction by means of the second vertical seal rolls 34, the film F is formed in cylindrical bags in two row by the respective vertical seal portions FH1, FH2 which are vertically sealed by the first and second vertical seal rolls 31, 34 as shown in FIG. 9, then the film F is laterally sealed in the lateral direction by a pair of opposing lateral seal rolls 20A of the first lateral seal mechanism 20 thus forming bottoms of the packaging bags by the lateral sealed portions FS, contents W1, W2 such as liquids are filled in the inside of the film F which are formed into bottomed cylinders in two rows by way of two nozzles 18, 18A provided to the filling mechanism 17, furthermore, the portions which form the bag opening sides of the film F are laterally sealed by the lateral seal rolls 20A of the first lateral seal mechanism 20 while feeding the film F so as to hermetically seal the contents W1, W2, these hermetically sealed lateral seal portions FS are sealed in duplicate by means of the lateral seal rolls 21A of the second lateral seal mechanism 21 and three sides of the film F are sealed so as to form the pouches p, then the intermediate portions of the lateral seal portions FS provided for forming the pouches P are cut into pouches P of single-pack package by means of the cutter mechanism 22, and these cut pouches P are transferred by way of the transfer mechanism 23 or alternatively the continuous pouches P are transferred in a continuously connected form by way of the transfer mechanism 23 provided that the operation of the cutter mechanism 22 is stopped.

In the above-mentioned embodiment, at the time of forming the pouches P while filling the contents W1, W2 therein, in case the width of the pouch P for packaging or the vertical sealing position is different, since the position of the both folded end peripheries of the film F which is folded back and guided by the film folding back portion 14 is used as the reference usually, the mounting position of the first vertical seal rolls 31 which vertically seal the film F while overlapping both folded back end peripheries of the film F is fixed and the first vertical seal rolls 31 are fixedly secured to the rotating shafts 25, and corresponding to an amount of difference of width of the pouches P or the vertical seal position, the mounting position of the second vertical seal rolls 34 is movably adjusted along the axial direction of the rotating shafts 25.

In this case, corresponding to the width of the film F, the guide rod 16 which supports the folded back portion of the film F is movably adjusted by way of the adjusting mechanism 15. Furthermore, in case of adjusting the position of the second vertical seal rolls 34 which vertically heat seal the folded back portion of the folded back film F and the central portion of the both folded back end peripheries of the film F, respective fastening bolts 40 are slackened so as to release the threading force exerted between the threaded portions 40A of the respective fastening bolts 40 and the threading portions 42A formed in the bolt mounting hole 42 of the tapered ring 39 and hence, the tapered rings 39 are operated in a direction opposite to the depth direction of the annular groove portion 37 formed on the second vertical seal roll 34, that is, the slackening direction so that the fitted condition that the tapered rings 39 are fitted into the annular groove portions 37 mounted on the second vertical seal rolls 34 is released. Accordingly, the fastening force applied the taped thin film portions 38 provided to the second vertical seal rolls 34 pressurized by the tapered rings 39 is eliminated and hence, the tapered thin film portions 38 which had the diameter thereof narrowed toward the outer peripheral surfaces of the rotating shafts 25 and were fixedly secured to the outer peripheral surfaces of the rotating shafts 25 by fastening are allowed to be movable in the axial direction of the rotating shaft 25. Accordingly, corresponding to the vertical seal positions of the central portions of the folded back film F, the second vertical seal rolls 34 are movably adjusted. After this adjustment, the fastening bolts 40 are fastened by rotation so as to make the tapered rings 39 inserted into the annular groove portions 37 of the second vertical seal rolls 34 and hence, the tapered thin film portion 38 formed in the second vertical seal roll 34 is narrowed toward the outer peripheral surfaces of the rotating shafts 25 by way of the tapered rings 39 and are fastened and fixedly secured to outer peripheral surfaces of the rotating shafts 25.

In case the mounting position of the second vertical seal rolls 34 is movably adjusted along the axial direction of the rotating shafts 25 corresponding to the width of the pouches P and the vertical seal position in the above-mentioned manner, the pusher bars are inserted in the hollow portions 43 of the rotating shafts 25 and push the heaters H from one side or the other side so as to movably adjust the heaters H and hence, the heaters H can be positioned and set corresponding to the moved second vertical seal rolls 34 such that the surface temperatures of the seal portions 30, 35 of the first and second vertical seal rolls 31, 34 are made substantially equal.

The surface temperature of the seal portions 30, 35 of the vertical seal rolls 31, 34 can be measured, for example, by mounting temperature detecting means such as thermocouples not shown in drawings on the respective vertical seal rolls 31, 34.

Figure 7:
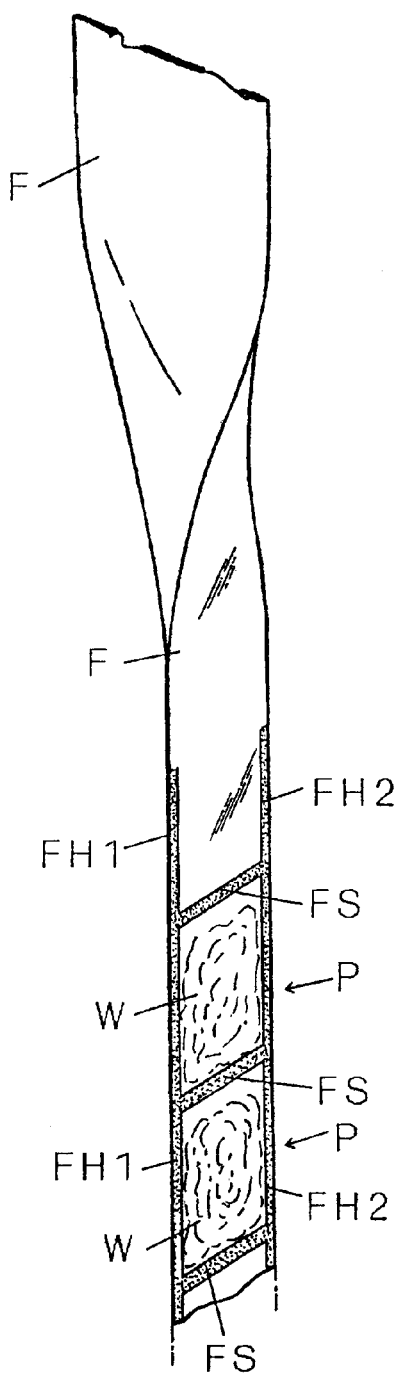
FIG. 7 is a perspective view of packaging bags having four sides thereof sealed to which a conventional example and the present invention are applicable.
Figure 8:
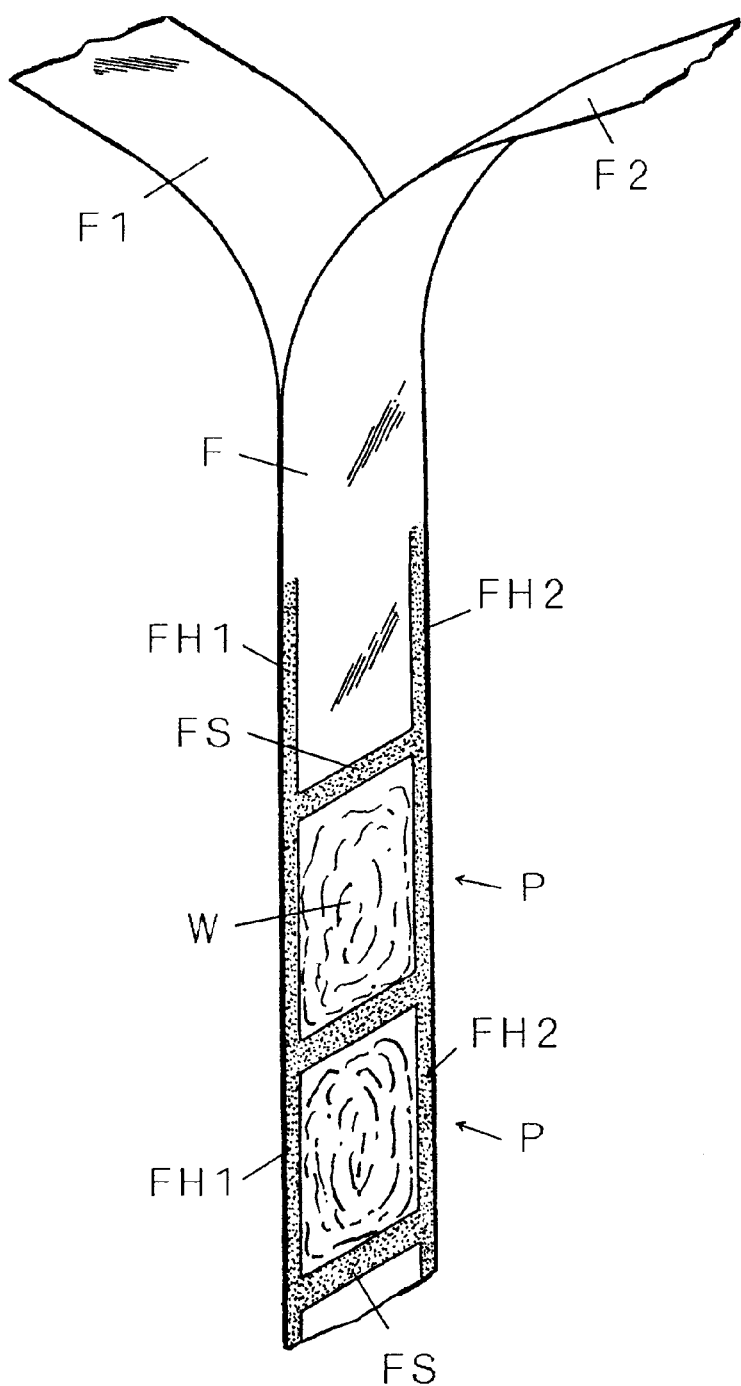
FIG. 8 is a perspective view of packaging bags which are formed of two sheets of films to which a conventional example and the present invention are applicable.

In the above-mentioned embodiment, the example where a sheet of film F is pulled and guided in the half folded condition, and the both folded back end portions which are folded back in the half folded condition and the central portion of the folded back portion are heat sealed in the vertical direction in a cylindrical shape in two rows to form pouches P by means of two vertical seal rolls 31, 34 has been described. However, for example, with respect to an embodiment where four sides of the film F are sealed so as to form pouches P as shown in FIG. 7 and an embodiment where two sheets of films F1, F2 are pulled and guided while being overlapped and both side end peripheries of the respective films F1, F2 are vertically heat sealed by means of two vertical seal rolls 31, 34 and simultaneously four sides of the films F1, F2 are sealed so as to form pouches P as shown in FIG. 8, the same operations and effects as those of the previously mentioned embodiment can be obtained by adopting the position adjusting mechanism which is capable of adjusting the position of the heaters H corresponding to the position adjusting mechanism of the vertical seal rolls 31, 34.

Furthermore, the present invention is not limited to the above-mentioned embodiment and various modified embodiments can be made within the scope of the gist of the present invention. For example, the pusher rods which are not shown in drawings are fixedly mounted on the rotating shafts and threaded portions are formed in end portions of the pusher rods and the position of the heater can be finely adjusted from outside by rotating the threaded portions.

Furthermore, although the first and second vertical seal rolls are respectively individually mounted in the previously mentioned embodiment, the first and second vertical seal rolls may be integrally formed to constitute a vertical seal roll.

As has been explained in detail, according to the present invention, the heat seal device of the filling and packaging machine where with a simple constitution, the surface temperatures of the seal portions of the vertical seal rolls disposed in a spaced apart manner with a given distance in the axial direction of the rotating shaft are made substantially equal and hence, the degree of sealing of respective vertical seal portions formed by the seal portions of the respective vertical seal rolls can be made equal thus stabilizing the sealed condition of the vertical seal portions can be provided.

Furthermore, in case the mounting positions of the vertical seal rolls are movably adjusted along the axial direction of the rotating shaft corresponding to the width of the pouches P and the vertical seal positions, the heater is movably adjusted such that corresponding to the moved vertical seal rolls, the heater is positioned and set so as to make the surface temperature of the seal portions provided to the first and second vertical seal rolls substantially equal. Accordingly, the further effect can be obtained.

Industrial Applicability

As has been described heretofore, the present invention discloses the heat seal device of the filling and packaging machine where the film wound like a roll is formed into bags and contents such as liquid, powdery material, or pasty material are filled into packaging bags. The present invention is useful to the mechanism for movably adjusting the position of a pair of the vertical seal rolls provided to the vertical seal mechanism at the time of forming the film into a cylindrical shape by the vertical seal mechanism of the heat seal device corresponding to the size and the width of the packaging bag for packaging. Particularly, the present invention is adapted for use in eliminating irregularities of the heating temperature of the vertical seal rolls by the heaters in case the distances of a plurality of pair of vertical seal rolls have to be changed.

What is claimed is:

1. A heat seal device of a filling and packaging machine, wherein a continuously fed film is vertically sealed by a vertical seal mechanism so as to form said film in a cylindrical shape and is sealed laterally by lateral seal mechanisms so as to form a bottom portion which forms packaging bags, contents are filled in said film formed in the bottomed cylindrical shape and, while said film is fed, a portion of said film which forms bag opening portion side is sealed laterally by said lateral seal mechanisms for continuously packaging as pouches, the improvement being characterized in that said vertical seal mechanism comprises a pair of rotating shafts, incorporating heaters mounted rotatably, and two pairs of vertical seal rolls which are mounted in pairs on said rotating shafts with a given distance in the axial direction of said rotating shafts and have seal portions protruded in a flange shape around outer peripheral portions respectively, said heaters incorporated in said rotating shafts are disposed movably along the axial direction of the rotating shafts for adjusting movably the position of the heaters relative to the position of two pairs of said vertical seal rolls so that the surface temperatures of said seal portions of said two pairs of said vertical seal rolls are made generally equal to each other, wherein temperature detecting means is mounted on said vertical seal rolls.

2. A heat seal device of a filling and packaging machine according to claim 1, wherein said rotating shafts are made of hollow shafts, said heaters are inserted in the inside of said hollow shafts, and said heaters are movably disposed in the inside of said hollow shafts.

3. A heat seal device of a filling and packaging machine according to claim 2, wherein spacers are provided to end portions of said heaters and said heaters are movable by pushing said heaters by way of said spacers.

4. A heat seal device of a filling and packaging machine according to claim 1, wherein at least one of said vertical seal rolls is disposed movable in the axial direction of said rotating shafts relative to said rotating shafts.

* * * * *